United States Patent Office …

3,017,380
ALDEHYDE-TRIAZINYL ARSENIC CONDENSATION PRODUCTS AND METHOD OF MAKING SAME
Gaetano F. D'Alelio, South Bend, Ind., assignor, by direct and mesne assignments, to Dal Mon Research Co., Cleveland, Ohio, a corporation of Delaware
No Drawing. Filed Dec. 5, 1958, Ser. No. 778,289
19 Claims. (Cl. 260—45.3)

This invention relates to the production of new synthetic materials and especially to new products having utility in the plastics, coating and impregnating arts.

The new compositions of this invention comprise the condensation products of an aldehyde, including aldehydes, hydroxy-aldehydes, and aldehyde addition products, e.g., formaldehyde, aldol, glucose, dimethylol urea, trimethylol melamine with a 1,3,5-triazine having attached thereto at least one aldehyde-reactable group, A, and at least one arseno-aryl group T; and having the general formula:

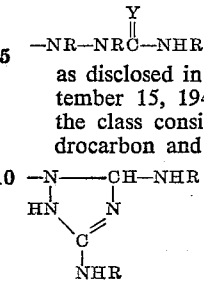

In the above formula, $n$ and $m$ are integers of at least one and no more than two and the sum of $m$ and $n$ does not exceed three, A represents an aldehyde-reactable group, T represents an aromatic group containing an arsenic substituent, and Y represents any monovalent radical.

In the above formula, it may be seen that when $n$ is one, $m$ can be one, with one Y group, or $m$ can be two with no Y group; or if $n$ is two, then $m$ is one and there will be no Y group. The only requirement for the triazine derivative of this invention is that it have at least one A group and at least one T group. For purposes of simplicity, the trivalent 1,3,5-triazine, or symmetrical triazine nucleus is sometimes represented hereinafter by $C_3N_3$.

The aldehyde-reactable group, is a grouping of atoms or radicals that react with aldehyde or polymeric-aldehydes to form a derivative such as illustrated by the following:

(a) $-NH_2 + CH_2O \longrightarrow -NHCH_2OH \xrightarrow{CH_2O} -N(CH_2OH)_2$ (b) $-NHR \xrightarrow{CH_2O} -\underset{R}{N}-CH_2OH$ (c) $-C_6H_4NH_2 \xrightarrow{CH_2O} -C_6H_4N=CH_2$ (d) 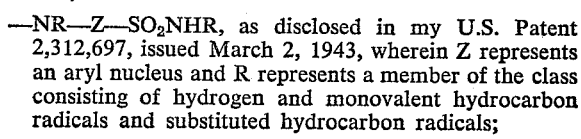

(e) 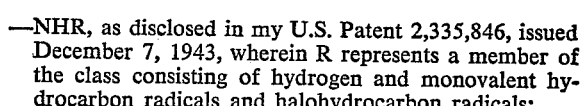

As illustrative examples of the aldehyde-reactable group, A, there are mentioned the following groups:

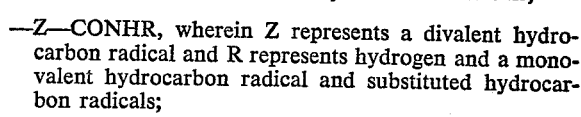

as disclosed in my U.S. Patent 2,295,562, issued September 15, 1942, wherein $x$ is an integer of at least 1 and not more than 2, Y represents a member of the class consisting of oxygen and sulfur, and R represents a member of the class consisting of hydrogen and monovalent hydrocarbon and halohydrocarbon radicals;

$$-NR-NR\overset{Y}{\underset{\|}{C}}-NHR$$

as disclosed in my U.S. Patent 2,295,565, issued September 15, 1942, wherein Y represents a member of the class consisting of hydrogen and monovalent hydrocarbon and halohydrocarbon radicals;

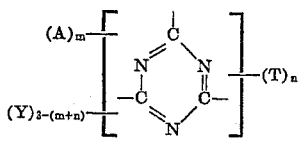

as disclosed in my U.S. Patent 2,295,562, issued September 15, 1942, wherein R represents a member of the class consisting of hydrogen and monovalent hydrocarbon and halohydrocarbon radicals;

$$-NR\overset{Y}{\underset{\|}{C}}-NHR$$

as disclosed in my U.S. Patent 2,312,688, issued March 2, 1943, wherein Y represents a member of the class consisting of oxygen and sulfur and R represents a member of the class consisting of hydrogen and hydrocarbon radicals and halohydrocarbon radicals;

$$-SC_nR_{2n}\overset{Z}{\underset{\|}{C}}-NR-Y-SO_2NHR$$

as disclosed in my U.S. Patent 2,312,690, issued March 2, 1943, wherein $n$ represents an integer and is at least one and not more than 2, Z represents a member of the class consisting of oxygen and sulfur, Y represents a bivalent carbocyclic radical, and R represents a member of the class consisting of hydrogen and monovalent hydrocarbon radicals and substituted hydrocarbon radicals;

—NR—Z—SO$_2$NHR, as disclosed in my U.S. Patent 2,312,697, issued March 2, 1943, wherein Z represents an aryl nucleus and R represents a member of the class consisting of hydrogen and monovalent hydrocarbon radicals and substituted hydrocarbon radicals;

$$-SC_nR_{2n}\overset{Z'}{\underset{\|}{C}}-NR-Y-OH$$

as disclosed in my U.S. Patent 2,312,700, issued March 2, 1943, wherein $n$ represents an integer and is at least one and not more than 2, Z' represents a member of the class consisting of oxygen and sulfur, Y represents a divalent carbocyclic radical and R represents a member of the class consisting of hydrogen and monovalent hydrocarbon radicals and substituted hydrocarbon radicals;

—NHR, as disclosed in my U.S. Patent 2,335,846, issued December 7, 1943, wherein R represents a member of the class consisting of hydrogen and monovalent hydrocarbon radicals and halohydrocarbon radicals;

—Z—CONHR, wherein Z represents a divalent hydrocarbon radical and R represents hydrogen and a monovalent hydrocarbon radical and substituted hydrocarbon radicals;

—B—Z—CONHR, wherein B represents a member of the class consisting of oxygen, sulfur and $$-\underset{\mathrm{R}}{\mathrm{N}}-,$$

Z represents a divalent hydrocarbon radical and substituted hydrocarbon radicals, and R represents a member of the class of hydrogen and monovalent hydrocarbon radicals and substituted hydrocarbon radicals;

HNR—NR—, wherein R represents a member of the class consisting of hydrogen and monovalent hydrocarbon radicals and substituted hydrocarbon radicals;

HO—Z—, wherein Z represents a divalent aromatic radical and substituted hydrocarbon radicals as hereinabove defined. A few typical triazine compounds are

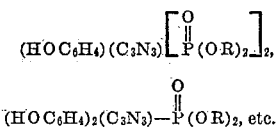

HO—Z—NR—, wherein R represents hydrogen and monovalent hydrocarbon radicals and substituted hydrocarbon radicals, and Z represents a divalent aromatic radical and substituted hydrocarbon radicals as hereinabove described. A few typical compounds are

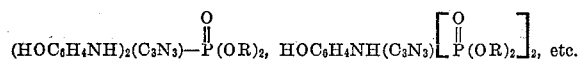

RCONHNR—, wherein R represents hydrogen and a monovalent hydrocarbon radical and substituted hydrocarbon radicals as previously defined herinabove.

R₂NCY—NR—CHR'—, as disclosed in my U.S. Patent 2,339,623, issued January 18, 1944, wherein Y represents oxygen or sulfur, at least one R represents hydrogen and the other R's represent hydrogen, a monovalent hydrocarbon radical or a monovalent halogenated hydrocarbon radical, and R' represents hydrogen or a monovalent aliphatic, carbocyclic or aromatic hydrocarbon radical of not more than 6 carbon atoms; etc.

Thus it may be seen that A may be any aldehyde-reactable group.

In the above triazine derivative formula, Y can be R which represents hydrogen or any monovalent hydrocarbon radical, whether saturated or unsaturated, substituted or unsubstituted, aliphatic, carbocyclic, aryl or heterocyclic, mono- or poly-nuclear, etc. Examples of suitable hydrocarbon groups represented by R are aliphatic, aromatic e.g., methyl, ethyl, propyl, isopropyl, butyl, secondary butyl, butenyl, amyl, hexyl, allyl, methallyl, cyclopentenyl, cyclohexyl, cyclohexenyl, phenyl, diphenyl, naphthyl, tolyl, xylyl, ethylphenyl, propylphenyl, isopropylphenyl, allylphenyl, benzyl, phenylallyl, phenylpropyl, etc. and their homologues, as well as those groups with one or more of their hydrogen atoms substituted by halogens, as, for example, fluorine, chlorine, nitro groups, nitroso groups, amino groups, carboxy groups, carbalkoxy groups, methoxy- and aryloxy groups, mercapto groups, etc.; Y can also be hydroxyl and the alkoxy and aryloxy radicals of aliphatic, cycloaliphatic, aromatic and heterocyclic hydroxy compounds, such as methyl alcohol, ethyl alcohol, butyl alcohol, isobutyl alcohol, dodecyl alcohol, phenol, the o-, m-, and p-cresols, the xylenols, the naphthols, ethylene glycol, methyl glycol ether, butyl glycol ether, glycerine, pentaerythritol, naphthol, hydroxy pyridine, including the alkoxy and aryloxy radicals of hydroxy acids and esters such as lactic acid, ethyl lactate, allyl lactate, methyl salicylate, and the chloro derivatives such as chlorophenol, chloronaphthol, ethylene chlorohydrin, and the acetoxy derivatives such as acetoxyethyl alcohol, etc., and these radicals are represented by RO—; Y can also be R—S— groups which are the mercapto equivalents to RO—; Y can also be —NR₂, that is, an amino group, a monosubstituted amino group or a disubstituted amino group, as for example, the radicals of methylamine, ethylamine, butylamine, nonylamine, benzyl amine, dimethyl amine, aniline, naphthylamine, ethanol amine, diethanolamine, disopropylamine, methylaniline, piperidine, amino-pyridine, and the hydrazine radicals, namely, R₂NNR— from hydrazine, unsymmetrical dimethyl hydrazine, symmetrical dimethyl hydrazine, trimethyl hydrazine, phenyl hydrazine; Y can also be the N-radicals of the amino acids, the amino-esters, the amino-amides, and the amino-nitriles, specific examples of which are —NHCH₂COOH,

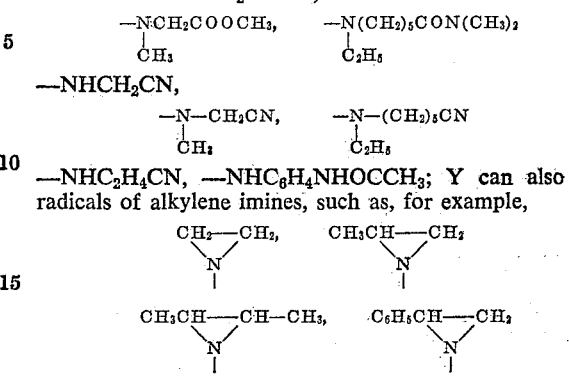

—NHC₂H₄CN, —NHC₆H₄NHOCCH₃; Y can also be radicals of alkylene imines, such as, for example,

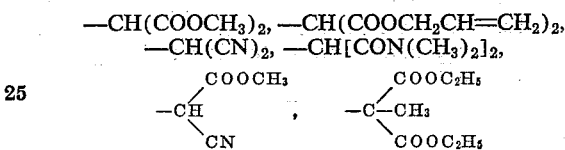

and the radicals of malonic esters and substituted malonic esters, nitriles, and amides, such as, for example,

—CH(COOCH₃)₂, —CH(COOCH₂CH=CH₂)₂,
—CH(CN)₂, —CH[CON(CH₃)₂]₂,

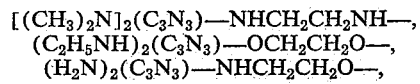

etc.; or Y can be the radical of another triazinyl ring, e.g., (CN₃NH)₂(C₃N₃)—, (HO)₂(C₃N₃)—, or the triazine ring can be attached through a bridge, such as

[(CH₃)₂N]₂(C₃N₃)—NHCH₂CH₂NH—,
(C₂H₅NH)₂(C₃N₃)—OCH₂CH₂O—,
(H₂N)₂(C₃N₃)—NHCH₂CH₂O—, etc.; Y can also be chlorine, bromine, —CN, COOR, etc.; as well as A and T. Thus, it may be seen that a wide variety of modified triazines can be used in the practice of this invention.

T represents an aromatic arsenic group which can be attached to the triazine ring directly or through other atoms, such as nitrogen, oxygen, sulfur, carbon, selenium, etc., such as, for example, —NR—(CR₂)ₑZ(V)ₚ,

—O—(CR₂)ₑZ(V)ₚ, —(CR₂)ₑ—Z(V)ₚ,
—NR—Z(V)ₚ, —O—Z(V)ₚ, —S—Z(V)ₚ,

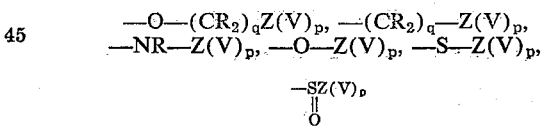

—SO₂Z(V)ₚ, —Se—Z(V)ₚ, —NRNR—Z(V)ₚ, wherein R represents a member of the class consisting of hydrogen, monovalent hydrocarbon radicals, and substituted hydrocarbon radicals as previously described, Z represents a member of the class consisting of polyvalent hydrocarbon radicals, and substituted hydrocarbon radicals having an aromatic group therein to which the arsenic group is attached, p represents an integer having a value of one to three, q represents an integer having a value of zero to six, and V represents an arsenic group having the formula

or —As=O, wherein R is as previously defined.

Such connecting groups can be represented by the structure —(B)ᵣ—Z—(V)ₚ wherein B represents

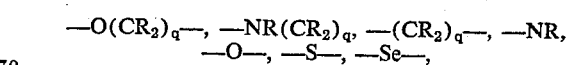

—SO₂—, and r represents a value of 0 and 1, and p, q, R, V, and Z are as previously defined. Thus alternately, the triazine derivatives used in the practice of this invention can be described by the formula

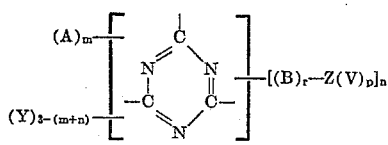

wherein A, Y, B, Z, V, *m*, *n*, *p*, and *r* are as previously defined. When V represents the arsenic acid group

not only the free acid but its salts such as sodium, potassium, lithium, calcium, copper, chromium, amine salts (e.g., ethanolamine, diethanolamine, isopropanol amine, polyethylene imine, amino-phenol, etc.), hydrazine, proteins, etc. are included.

Such connecting groups can have substituents thereon such as, chloro, fluoro, alkoxy, aryloxy, acyloxy groups, etc. The arsenic group or groups are attached directly to an aromatic nucleus. Typical examples of the polyvalent radical include, but are not restricted to, the following: $-C_6H_4-$;

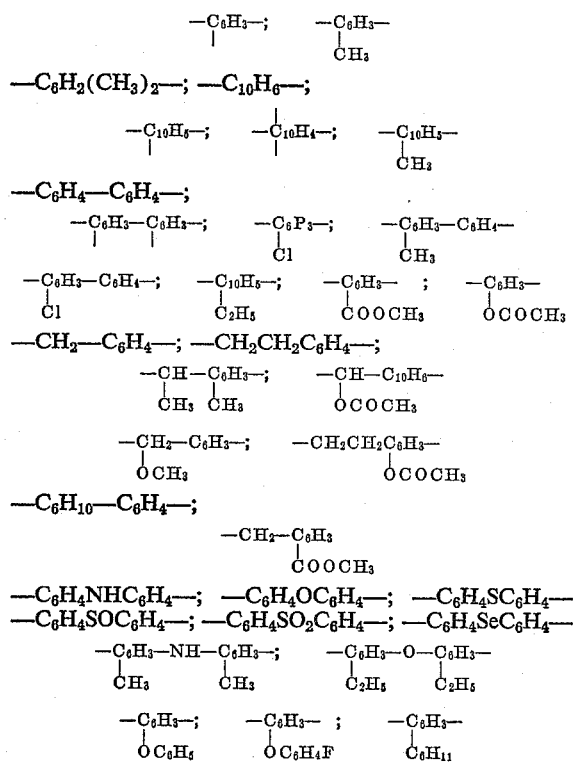

etc.

In practicing this invention, the initial condensation reaction can be carried out at normal or elevated temperatures, at atmospheric, sub-atmospheric, or super-atmospheric pressures, and under natural, alkaline, or acid conditions. Preferably, in most cases, the reaction between the components is initiated under alkaline conditions.

Any substance yielding an alkaline or an acid aqueous solution can be used in obtaining alkaline or acid conditions for the initial condensation reaction. For example, an alkaline substance such as sodium, potassium carbonate, mono-, di-, or tri-amines, etc., can be used. In some cases, it is desirable to cause the initial condensation reaction between the components to take place in the presence of a primary condensation catalyst and a secondary condensation catalyst. The primary catalyst can be either an aldehyde-non-reactable nitrogen-containing basic tertiary compound, e.g., tertiary amines such as trialkyl (e.g. trimethyl, triethyl, etc.) amines, or an aldehyde-reactable nitrogen-containing basic compound, for instance, ammonia, primary amines (e.g. ethyl-amine, propyl amine, etc.) and secondary amines (e.g. dipropyl-amine, dibutylamine, etc.). The secondary condensation catalyst, which ordinarily is used in an amount less than the amount of the primary catalyst, advantageously is a fixed alkali, for instance, a carbonate, cyanide, or hydroxide of an alkali metal (e.g. sodium, potassium, lithium, etc.).

Illustrative examples of acid condensation catalysts that can be employed are inorganic or organic acids, such as hydrochloric, sulfuric, phosphoric, acetic, lactic, acrylic, malonic, etc., or acid salts, such as sodium acid sulfate, monosodium phosphate, monosodium phthalate, etc. Mixtures of acids, of acid salts, or acids and acid salts can be employed, if desired.

The reaction between the aldehyde, e.g., formaldehyde, and the triazine derivative can be carried out in the presence of solvents, diluents, fillers, or other natural or synthetic resinous bodies, or while admixed with other materials that also can react with the aldehydic compound or with the triazine derivative, e.g., ketones, urea, thiourea, selenourea, iminourea (guanidine), substituted ureas, thioureas, selenoureas, and iminoureas, numerous examples of which are given in my U.S. Patent 2,322,566, issued June 22, 1943; monoamides of monocarboxylic acids and polycarboxylic acids and polyamides of polycarboxylic acid, e.g., acetamide, halogenated acetamides (e.g. chloroacetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazine compounds, such as are disclosed in my U.S. Patent 2,382,211, issued August 14, 1945; aminotriazines, e.g., melamine, ammeline, ammelide, melem, melam, melon, etc.; phenol and substituted phenols, e.g., the cresols, the xylenols, the tertiary alkylphenols and other phenols, such as mentioned in my U.S. Patent 2,339,441; monohydric and polyhydric alcohols, e.g., butyl propylene glycol, pentaerythritol, polyvinyl alcohol, etc.; amines, including aromatic amines, e.g., aniline, etc., and the like. In such cases, the triazine derivative should represent 5–95% by weight of the aldehyde reactive portion of such mixture.

The modifying reactants can be incorporated with the triazine derivative and the aldehyde to form an intercondensation product by mixing all the reactants and effecting condensation therebetween or by various permutations of reactants. For instance, a partial condensation product can be formed of ingredients comprising (1) urea or melamine or urea and melamine, (2) a triazine derivative of this invention, (3) an aldehyde, including polymeric aldehydes, hydroxy aldehydes and aldehyde-addition products, for instance, formaldehyde, paraformaldehyde, dimethylol urea, a polymethylol melamine; and thereafter reaction effected between this partial condensation product, and, for example, a curing reactant, specifically a chlorinated acetamide or an amino acid.

Some of the condensation products of this invention are thermoplastic materials even at an advanced stage of condensation, while others are thermosetting or potentially thermosetting bodies that convert under heat or under heat and pressure to an insoluble infusible state. The thermoplastic condensation products are of particular value as plasticizers for other synthetic resins. The thermosetting, or potentially thermosetting resinous condensation products, alone or mixed with fillers, pigments, dyes, lubricants, plasticizers, curing agents, etc., can be used, for example, in the production of molding and laminating compositions. In other cases, they can be used as ion exchange resins and as tanning agents.

The liquid intermediate condensation products of this invention can be concentrated by the removal of, or diluted further by the addition of volatile solvents, to form liquid coating compositions of adjusted viscosity and concentration. The heat-convertible or potentially heat-convertible resinous condensation products can be used in the liquid state, for instance, as impregnants for wood, leather, paper and other porous bodies; as surface-coating materials in the production of paints, varnishes, lacquers, enamels, etc.; for general adhesive applications in producing laminated articles, and for other purposes. The liquid, heat-hardenable or potentially heat-hardenable condensation products also can be used directly as casting resins, while those which are of gell-like nature in the partially condensed state can be granulated and dried to form clear, unfilled heat-convertible resinous products.

In producing these new condensation products the choice of the aldehyde is dependent largely on economic considerations and upon the particular properties desired in the finished product. Preferred aldehydic reactants are formaldehyde and compounds engendering formaldehyde, e.g., paraformaldehyde, hexamethylene tetramine, etc. Illustrative examples of other aldehydes that can be employed are acetaldehyde, propionaldehyde, butyraldehyde, heptaldehyde, octaldehyde, acrolein, methacrolein, crotonaldehyde, benzaldehyde, furfural, hydroxyaldehydes (e.g., aldol, glucose, glycollic aldehyde, glyceraldehyde, etc.), mixtures thereof or mixtures of formaldehyde (or compounds engendering formaldehyde) with such aldehydes. Illustrative examples of aldehyde-addition products that can be used instead of the aldehydes themselves are the mono- and poly-(N-carbinol) derivatives, particularly the mono- and polymethylol derivatives of urea, thiourea, selenourea, and iminourea, and substituted ureas, thioureas, selenoureas, and iminoureas, mono- and poly-(N-carbinol) derivatives of amides or polycarboxylic acids, e.g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines. Particularly good results are obtained with active methylene-containing bodies as a methylol urea, more particularly mono- and dimethylol ureas, a methylol aminotriazine, more particularly a methylol melamine, e.g., monomethylol melamine and polymethylol melamines (di-, tri-, tetra-, penta-, and hexamethylol melamines). Mixtures of aldehydes and aldehyde-addition products can be employed, e.g., mixtures of formaldehyde and methylol compounds, such, for instance, as dimethylol urea, trimethylol melamine, hexamethylol melamine, etc.

The ratio of the aldehydic reactant to the triazine derivative can be varied over a wide range depending upon the particular properties desired in the finished product. Ordinarily these reactants are employed in an amount corresponding to at least one mole of the aldehyde, especially formaldehyde, for each mole of the triazine derivative. Thus, for example, one to seven or eight or more moles of an aldehyde can be used for each mole of the triazine derivative. When an aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 to 3 up to 15 to 20 or more moles of such alkylol derivatives for each mole of the triazine derivative.

As indicated hereinbefore, the properties of the fundamental resin can be varied widely by introducing other modifying bodies before, during, or after effecting condensation between the primary components. Thus, modifying agents that can be used include, for example, methyl, ethyl propyl, isopropyl, isobutyl, hexyl, etc., alcohols; polyhydric alcohols, such as, for example, diethylene glycol, triethylene glycol, pentaerythritol, etc.; alcohol ethers, e.g., ethylene glycol monomethyl ether, ethylene glycol monoethyl ether, diethylene glycol monobutyl ether, etc.; amides, such as formamide, stearamide, acrylamide, benzene sulfonamides, toluene sulfonamide, the aryl disulfonamides, adipic diamide, phthalamide, etc.; amines, e.g., ethylene diamine, phenylene diamine, etc.; ketones, including halogenated ketones, etc.; nitriles, including halogenated nitriles, e.g., acrylonitrile, methacrylonitrile, succinonitrile, fumaryl nitrile, chloroacetonitriles, etc.; acylated ureas, more particularly halogenated acylated ureas of the kind described in my U.S. Patent 2,851,559, and others.

The modifying bodies also can take the form of high molecular weight bodies with or without resinous characteristics, for example, hydrolyzed wood products, formalized cellulose derivatives, lignin, protein-aldehyde condensation products, aminotriazine, aldehyde condensation products, aminotriazole-aldehyde condensation products, polyacrylamide, styrene-maleic imide copolymers, etc. Other examples of modifying bodies are the urea-aldehyde condensation products, the aniline-aldehyde condensation products, furfural condensation products, phenol-aldehyde condensation products, modified or unmodified, saturated or unsaturated polyhydric-alcohol-polycarboxylic acid condensation products, water-soluble cellulose derivatives, natural gums and resins, such as shellac, rosin, etc.; polyvinyl compounds, such as polyvinyl esters, e.g., polyvinyl acetate, polyvinyl butyrate, etc., polyvinyl ethers including polyvinyl acetals, especially polyvinyl formal, etc.

Dyes, pigments, plasticizers, mold lubricants, opacifiers and various reinforcing fillers (e.g. wood flour, glass fibers, including difibrated asbestos, mineral wool, mica, cloth cuttings, glass cloth, glass mat, etc.) can be compounded with the resin in accordance with conventional practice to provide various thermoplastic and thermosetting molding compositions.

The modified and unmodified resinous compositions of this invention have a wide variety of uses. For example, in addition to their use in the production of molding compositions, they can be used as modifiers of other natural and synthetic polymers, as laminating varnishes in the production of laminated articles wherein sheet materials, e.g., paper, cloth, sheet asbestos, glass mats and glass fibers, etc., are coated and impregnated with the resin, superimposed and thereafter united under heat or heat and pressure. They can be used in the production of wire coatings or baking enamels from which insulated wires and other coated products are made; for bonding or cementing together mica flakes to form a laminated mica article, for bonding together abrasive grains in the production of resin-bonded abrasive articles such, for instance, as grindstones, sandpapers, emery cloths, etc., in the manufacture of electrical resistors, etc. They can also be employed for treating cotton, linen, and other cellulosic materials in sheet or other form. They can also be used as impregnants for electrical coils and for other electrically insulating applications.

The present invention is based on the discovery that new and valuable materials having particular utility in the polymer, plastics, impregnating, and coating arts can be produced by effecting reaction between ingredients comprising an aldehyde, including polymeric aldehydes and aldehyde-addition products, and triazine compounds of the kind described hereinabove. The modified and unmodified condensation products have a wide variety of uses. Those condensation products having the —As=O grouping can be used as molding compounds, laminating varnishes, impregnants alone or with other polymers and fillers, in the conventional manner; they act as preservatives for cellulosic substances, such as paper, wood, cotton, wool, leather, silk, proteins and the like; and they can also be used as resins to increase the wet-strength of paper and wood pulps. Those condensation products containing an

grouping can be used as ion exchange resins, as preservatives as such, or as their copper or 8-hydroxy quinoline salt, as additive-binders to insecticidal formulations, and as additives to increase the wet strength of paper while preserving it. The calcium, zinc, and magnesium salts of these products can be used as molding compounds and as modifiers for other natural and synthetic polymers, for example, in laminating varnishes and in the production of laminated products wherein sheet materials, e.g., paper, cloth sheet asbestos, glass mats, glass fibers, etc., are coated and impregnated with resin, superimposed and thereafter united under heat and pressure.

The condensation products of this invention are particularly useful in the treating and tanning of leathers. As is well known, resin tannage should be water-soluble or water-dispersible and their solutions should tolerate fair concentrations of salt. They should be capable of penetrating into the skin before and during early stages of tanning and before and during the early stages of polymerization. Preferably the tannage should be very pale or water-white in color. These objectives are achieved by using products made according to the practice of this invention; for example, the tolerance to the salt solution, that is, the salting-out value and the water-solubility can be changed by varying the number of aryl arsonic acids attached to the triazine ring, e.g., $$(NH_2)(C_3N_3)[NHC_6H_4AsO(ONa)_2]$$

or $$(NH_2)_2(C_3N_3)-NHC_6H_4AsO(ONa)_2$$

or by using a sulfonic acid substituent along with the arsonic acid or arsine oxide grouping, e.g., $$(NH_2)(C_3N_3)(-NHC_6H_4SO_3Na)$$
$$[-NHC_6H_4AsO(OH)_2]$$

or $$(NH_2)(C_3N_3)(-NHC_6H_4SO_3Na)(-NHC_6H_4As=O)$$

or by condensing with urea, melamine, dimethylol urea, dimethylol melamine, trimethylol melamine, phenol alcohols, etc., and by varying the ratio of such modifying co-condensing substances. Also by using the products made according to the practice of this invention, the fat-liquoring characteristics of the tannage can be readily changed by selecting appropriate R groups in the triazine derivative, for example by using $$(C_{10}H_{21}NH)_2(C_3N_3)-NHC_6H_4AsO(OH)_2$$

and $$(C_{10}H_{21}NH)(C_3N_3)[NHC_6H_4AsO(OH)_2]_2$$

instead of the corresponding $-NH_2$ substituted triazines. Furthermore, the solubility or dispersibility of the condensation product can be increased by using as Y groups those groups that increase solubility such as $$H(OCH_2CH_2)_n-O-$$

where $n$ has a numerical value of one to 50 or more. Also, these condensation products can be modified so that they act as flame-retardants as well as preservatives not only for leather but for such substances as wool, cotton, wood, paper, etc., by using compounds in the practice of this invention in which Y represents groups such as:

$$-\overset{O}{\underset{\|}{P}}(OR)_2, \quad -\overset{O}{\underset{\underset{NR_2}{|}}{\overset{\|}{P}}}-OR$$

$-C_6Cl_5$, etc.

Among the triazine derivatives embraced by the formulas of the various classes of compounds used in producing the new condensation products of this invention are the triazine derivatives having substituents indicated by the groups attached to the structure, $$\begin{array}{c} A \\ | \\ C \\ N \swarrow \quad \searrow N \\ \| \quad \quad \| \\ Y-C \quad \quad C-T \\ \searrow \quad \swarrow \\ N \end{array}$$

in the following table.

| Substituent A | Substituent Y | Substituent T |
|---|---|---|
| $-NH_2$ | $-NH_2$ | $-NH-C_6H_4-AsO_3H_2$ |
| $-NH_2$ | $-NH-C_6H_4-AsO_3H_2$ | $-NH-C_6H_5-AsO_3H_2$ |
| $-NHCN_3$ | $-NHCH_3$ | $-NH-C_6H_4-AsO_3H_2$ |
| $-NH_2$ | $-NH_2$ | $-\overset{CH_3}{\underset{|}{N}}-C_6H_4-AsO_3H_2$ |
| $-NH_2$ | $-NH_2$ | $-NH-C_6H_3-OH$ <br> $\quad\quad\quad\quad\;\;\;\underset{|}{AsO_3H_2}$ |
| $-NH_2$ | $-NH_2$ | $-NH-C_6H_3-AsO_3H_2$ <br> $\quad\quad\quad\quad\;\;\;\underset{|}{OH}$ |
| $-NH_2$ | $-NH_2$ | $-NH-C_6H_3-AsO_3H_2$ <br> $\quad\quad\quad\quad\;\;\;\underset{|}{Cl}$ |
| $-NHCH_3$ | $-NHCH_3$ | $-NH-C_6H_4-AsO_3H_2$ |
| $-NH_2$ | $-NHCH_2CH_2OH$ | $-NH-C_6H_4-AsO_3H_2$ |
| $-NH_2$ | $-NHCH_2COOCH_3$ | $-NH-C_6H_4-AsO_3H_2$ |
| $-NH_2$ | $-NHC_6H_5$ | $-NH-C_6H_4-AsO_3Na_2$ |
| $-NH_2$ | $-NHC_6H_4OH$ | $-NH-C_6H_4-AsO_3H_2$ |
| $-NHC_6H_4OH$ | $-NHC_6H_4OH$ | $-NH-C_6H_4-AsO_3H_2$ <br> $\quad\quad\quad\quad\;\;\;\underset{|}{OH}$ |
| $-NHC_6H_3Cl_2$ | $-NH_2$ | $-NH-C_6H_4-AsO_3H_2$ |
| $-NHCH_3$ | $-NHCH_3$ | $-\overset{CH_3}{\underset{|}{N}}-C_6H_4-AsO_3H_2$ |
| $-NHC_6H_5$ | $-NHC_6H_5$ | $-NH-C_{10}H_6-AsO_3H_2$ |
| $-NH_2$ | $-NH-C_{10}H_7$ | $-NH-C_6H_4-AsO_3H_2$ |
| $-NH_2$ | $-NH_2$ | $-NHCH_2-C_6H_4-AsO_3H_2$ |
| $-NHCH_3$ | $-NHCH_3$ | $-O-C_6H_4-AsO_3H_2$ |
| $-NHCH_3$ | $-NHCH_3$ | $-O-C_6H_4-O-C_6H_4-AsO_3H_2$ |
| $-NHCH_3$ | $-NHCH_3$ | $-O-C_6H_4-NH-C_6H_4-AsO_3H_2$ |
| $-NH_2$ | $-NH_2$ | $-O-C_{10}H_6-AsO_3H_2$ |
| $-NH_2$ | $-NH_2$ | $-S-C_6H_4-AsO_3H_2$ |
| $-NHC_6H_4OH$ | $-NHC_6H_4OH$ | $-S-C_6H_4-AsO_3H_2$ |
| $-NHCH_2CH_2OH$ | $-NH_2$ | $-S-C_6H_3-AsO_3H_2$ <br> $\quad\quad\quad\quad\;\;\;\underset{|}{Cl}$ |

| Substituent A | Substituent Y | Substituent T |
|---|---|---|
| —NH₂ | —NHCH₂COOH | —Se—C₆H₄—AsO₃H₂ |
| —NH₂ | —NH₂ | —Se—C₆H₄—AsO₃H₂ |
| —NH₂ | —O—C₆H₄—AsO₃H₂ | —O—C₆H₄—AsO₃H₂ |
| —NH₂ | —S—C₆H₄—AsO₃H₂ | —S—C₆H₄—AsO₃H₂ |
| —NH₂ | —Se—C₆H₄—AsO₃H₂ | —Se—C₆H₄—AsO₃H₂ |
| —NHC₆H₅ | —NHC₆H₅ | —O—C₆H₄—AsO₃H₂ |
| NH₂— | —NH₂ | —O—C₆H₃—AsO₃H₂ <br> $\vert$ <br> OC₂H₅ |
| NH₂— | —NH₂ | —O—C₆H₃—AsO₃H₂ <br> $\vert$ <br> OC₃H₇ |
| NH₂— <br> HOC₆H₇O— | CH₃O— <br> C₂H₅O— | —NH—C₆H₄—AsO₃H₂ <br> —NH—C₆H₄—AsO₃H₂ |
| HOC₆H₄NH— | ClCH₂CH₂—O— | —N—C₆H₄—AsO₃H₂ <br> $\vert$ <br> CH₂ <br> $\vert$ <br> OH |
| NH₂OCCH₂O— | CH₂=CH—CH₂—O— | —NH—C₆H₃—AsO₃H₂ |
| NH₂OCCH₂S— | CH₂=CH—CH₂—O— | —NH—C₆H₄—AsO₃H₂ |
| HOC₆H₄—S— | C₆H₅O— | —NH—C₁₀H₆—AsO₃H₂ |
| NH₂CONH— | ClC₆H₄O— | —NH—C₆H₄—O—C₆H₄—AsO₃H₂ |
| H₂NSO₂C₆H₄NH— | ClC₂H₄O₃— | —N—C₆H₄—AsO₃H₂ <br> $\vert$ <br> CH₃ |
| NH₂— | C₁₀H₇—O— | —NH—C₆H₃—AsO₃H₂ <br> $\vert$ <br> C₂H₅ |
| NH₂— | CH₃—S— | —NH—C₆H₄—NH—C₆H₄—AsO₃H₂ |
| NH₂— | C₂H₅—S— | —NH—C₆H₃—AsO₃H₂ <br> $\vert$ <br> OC₂H₅ |
| NH₂— | C₆H₅—S— | —NH—C₆H₃—AsO₃H₂ <br> $\vert$ <br> OC₂H₅ |
| CH₃CONHNH— | HOC₆H₄O— | —NH—C₆H₄—AsO₃H₂ |
| H₂NOC\CH— /H₂NOC | (CH₃)₂NC₆H₄—O— | OH <br> $\vert$ <br> —NH—C₆H₃—AsO₃H₂ |
| H₂NOC\CH— /H₂NOC | C₂H₅Se— | —NH—C₁₀H₆—AsO₃H₂ |
| O  OC₂H₅ <br> \\ / <br> NH₂—P— | CH₃O— | —NHCH₂—C₆H₄—AsO₃H₂ |
| O  OC₂H₅ <br> \\ / <br> NH₂—P— | —NH₂ | —O(CH₂)₄NH—C₆H₄—As=O |
| NH₂— | (CH₃)₂N— | —O—C₆H₄As=O |
| NH₂— | (C₂H₅)₂N— | —O—C₆H₄As=O |
| NH₂— | (C₄H₉)N— | —O—C₆H₄As=O |
| NH₂— | HO—C₆H₄—N— <br> $\vert$ <br> CH₃ | —O—C₆H₄As=O |
| —NH₂ | CH₃OC₆H₄N— <br> $\vert$ <br> CH₃ | —NHC₆H₄As=O |
| —NH₂ | CH₃COOC₆H₄N— <br> $\vert$ <br> CH₃ | —NHC₆H₄As=O |
| —NH₂ | C₆H₅OC₆H₄—N— <br> $\vert$ <br> CH₃ | —SC₆H₄As=O |
| —NH₂ | HOCH₂CH₂N— <br> $\vert$ <br> C₆H₅ | —SC₆H₄As=O |
| —NH₂ | CH₂CH₂ <br> CH₃CON<  >N— <br> CH₂CH₂ | —SC₆H₄As=O |
| —NH₂ | —NHC₆H₄As=O | NHC₆H₄As=O |
| —NH₂ | —O—C₆H₄—AsO₃H₂ | —NHC₆H₄As=O |
| —NH₂ | —S—C₆H₄—AsO₃Na₂ | —NHC₆H₄As=O |
| —NH₂ | —S—C₆H₃—AsO₃H₂ <br> $\vert$ <br> Cl | —NHC₆H₄As=O |

| Substituent A | Substituent Y | Substituent T |
|---|---|---|
| —NH₂ | —SC₆H₄C₆H₄AsO₃H₂ | —NHC₆H₄As=O |
| —NH₂ | —OC₆H₄SC₆H₄AsO₃H₂ | —NHC₆H₄As=O |
| —NH₂ | —SC₆H₄SC₆H₄—AsO₃H₂ | —NHC₆H₄As=O |
| —NH₂ | —SC₆H₄SeC₆H₄AsO₃H₂ | —NHC₆H₄As=O |
| —NH₂ | —SeC₆H₄AsO₃H₂ | —NHC₆H₄As=O |
| —NH₂ | —O—C₁₀H₅(AsO₃H₂)₂ | —NHC₆H₄As=O |
| —NH₂ | CH₃O— | —C₆H₄—AsO₃H₂ |
| —NH₂ | CH₃S— | —C₆H₄—AsO₃H₂ |
| —NH₂ | CH₃O— | —C₆H₃—AsO₃H₂<br>\|<br>Br |
| —NH₂ | CH₃—S— | —C₆H₃—AsO₃H₂<br>\|<br>CH₃ |
| —NH₂ | C₂H₅—Se— | —C₆H₄C₆H₄—AsO₃H₂ |
| —NH₂ | C₆H₅—S— | —C₁₀H₆—AsO₃H₂ |
| —NH₂ | (CH₃)₂C₆H₃—O— | —C₆H₃—AsO₃H₂<br>\|<br>NO₂ |
| —NH₂ | HOC₆H₄—O— | —C₆H₄—AsO₃H₂ |
| —NH₂ | CH₃OC₆H₄—O— | —C₆H₃—AsO₃H₂<br>\|<br>CH₃ |
| —NH₂ | CH₃OC₆H₄—O— | —C₆H₄C₆H₄AsO₃H₂<br>\|<br>Cl |
| —NH₂ | CH₃OC₆H₄—O— | —C₆H₂—AsO₃H₂<br>\|<br>Cl |
| —NH₂ | CH₃O— | —OC₆H₄AsO₃(CH₃)₂ |
| —NH₂ | C₂H₅O— | —SC₆H₄AsO₃(CH₃)₂ |
| —NH₂ | HOCH₂CH₂OCH₂CH₂O— | —OC₆H₃AsO₃(CH₃)₂<br>\|<br>OH |
| —NH₂ | CH₂=CHCH₂O— | —OC₆H₃AsO₃(CH₃)₂<br>\|<br>OH |
| —NH₂ | CH₂=CH—CH₂—OCH₂CH₂O— | —S—C₆H₃—AsO₃(CH₃)₂<br>\|<br>Cl |
| —NH₂ | CH₃COOCH₂CH₂O— | —SC₆H₄C₆H₄AsO₃(CH₃)₂ |
| —NH₂ | CH₃COOC₆H₄O— | —SeC₆H₄AsO₃(CH₃)₂ |
| —NH₂ | ClC₆H₄S— | —OC₆H₄C₆H₄AsO₃(CH₃)₂ |
| —NH₂ | Cl₂C₆H₃S— | —OC₁₀H₅AsO₃(CH₃)₂ |
| —NH₂ | C₆H₅O— | —OC₆H₄AsO₃(CH₃)₂ |
| —NH₂ | CH₃O— | —OC₆H₄AsO₃(CH₃)₂ |
| —NH₂ | (CH₃)₂N— | —NHC₆H₄AsO₃(CH₃)₂ |
| —NH₂ | (C₂H₅)N— | —NH—C₆H₃—SO₂NH<br>\|<br>AsO₃(CH₃)₂ |
| —NH₂ | (C₃H₇)₂N— | CH₃<br>\|<br>—N—C₆H₃—AsO₃(CH₃)₂<br>\|<br>Cl |
| —NH₂ | (CH₂=CHCH₂)₂N— | —NHC₆H₃—AsO₃(C₆H₅)₂<br>\|<br>OH |
| —NH₂ | CH₃<br>\|<br>N—<br>\|<br>C₆H₅ | —NHC₁₀H₄(Cl)₂<br>\|<br>AsO₃(C₆H₅)₂ |
| —NH₂ | —NHC₆H₄OH | —NH—C₆H₄—AsO₃Na₂ |
| —NHC₆H₄OH | —NHC₆H₄OH | —NH—C₆H₃—AsO₃K₂<br>\|<br>OH |
| —NHC₆H₃Cl₂ | —NH₂ | —NH—C₆H₄—AsO₃Ca |
| —NHCH₃ | —NHCH₃ | CH₃<br>\|<br>—N—C₆H₄—AsO₃Li₂ |
| —NHC₆H₅ | —NHC₆H₅ | [—NH—C₁₀H₆—AsO₃]₃Cr₂ |
| —NH₂ | —NH—C₁₀H₇ | —NH—C₆H₄—AsO₃Cu |
| —NH₂ | —NH₂ | —NHCH₂—C₆H₄—AsO₃Na₂ |
| —NHCH₃ | —NHCH₃ | —O—C₆H₄—AsO₃(NH₄)₂ |
| —NHCH₃ | —NHCH₃ | —O—C₆H₄—O—C₆H₄—AsO₃HNa |
| —NHCH₃ | —NHCH₃ | —O—C₆H₄—NH—C₆H₄—AsO₃HK |
| —NH₂ | —NH₂ | —O—C₁₀H₆—AsO₃HNH(C₂H₅OH)₂ |
| —NH₂ | —NH₂ | —S—C₆H₄—AsO₃HNH(C₂H₇OH)₂ |
| —NHC₆H₄OH | —NHC₆H₄OH | —S—C₆H₄—AsO₃Na₂ |
| —NHCH₂CH₂OH | —NH₂ | —S—C₆H₄—AsO₃(NHC₂H₅OH)₂<br>\|<br>Cl |
| —NH₂ | —NHCH₂COOH | —Se—C₆H₄—AsO₃K₂ |
| —NH₂ | —NH₂ | —Se—C₆H₄—AsO₃Ca |
| —NH₂ | —O—C₆H₄—AsO₃H₂ | —O—C₆H₄—AsO₃Na₂ |

| Substituent A | Substituent Y | Substituent T |
|---|---|---|
| $-NH_2$ | $-S-C_6H_4-AsO_3H_2$ | $-S-C_6H_4-AsO_3HNH_3C_6H_4OH$ |
| $-NH_2$ | $-Se-C_6H_4-AsO_3H_2$ | $-Se-C_6H_4-AsO_3NH_3NH_2$ |
| $-NHC_6H_5$ | $-NHC_6H_5$ | $-O-C_6H_4-AsO_3HNa$ |
| $NH_2-$ | $-NH_2$ | $-O-C_6H_3-AsO_3HK$<br>$\quad\quad\quad\;\; \mid$<br>$\quad\quad\quad OC_2H_5$ |
| $NH_2-$ | $-NH_2$ | $-O-C_6H_3-AsO_3Ca$<br>$\quad\quad\quad\;\; \mid$<br>$\quad\quad\quad OC_2H_7$ |
| $NH_2-$<br>$HOC_6H_7O-$ | $CH_3O-$<br>$C_2H_5O-$ | $-NH-C_6H_4-AsO_3HLi$<br>$-NH-C_6H_4-AsO_3HNa$ |
| $-NH_2$ | $HOCH_2CH_2$<br>$\quad\quad\;\;\diagdown$<br>$\quad\quad\quad\; N-$<br>$\quad\quad\;\;\diagup$<br>$HOCH_2CH_2$ | $-NHC_6H_3AsO_2(CH_3)_2$<br>$\quad\quad\quad\quad\quad\;\; \mid$<br>$\quad\quad\quad\quad\quad COOCH_3$ |
| $-NH_2$ | $\quad\;\; CH_2CH_2$<br>$\quad\diagup\quad\quad\diagdown$<br>$O\quad\quad\quad\;\; N-$<br>$\quad\diagdown\quad\quad\diagup$<br>$\quad\;\; CH_2CH_2$ | $-NHC_6H_3AsO_3(CH_3)_2$<br>$\quad\quad\quad\quad\quad\;\; \mid$<br>$\quad\quad\quad\quad\quad CN$ |

The triazine derivatives used in the practice of this invention can be prepared conveniently by condensing the corresponding halotriazines, for example, the chlorotriazines with the corresponding aryl arsenic compound in the presence of a hydrohalide acceptor, such as sodium hydroxide, sodium carbonate, etc., for example, (1) $\;\;(A)_2(C_3N_3)Cl + NH_2C_6H_4AsO_3H_2$
$\quad\quad \rightarrow (A)_2(C_3N_3)(NHC_6H_4AsO_3H_2)$
(2) $\;\;A(C_3N_3)Cl_2 + 2NH_2C_6H_4AsO_3H_2$
$\quad\quad \rightarrow (A)(C_3N_3)(NHC_6H_4AsO_3H_2)_2$
(3) $\;\;(A)(Y)(C_3N_3)Cl + NH_2C_6H_4AsO_3H_2$
$\quad\quad \rightarrow (A)(Y)(C_3N_3)(NHC_6H_4AsO_3H_2)$
(4) $\;\;(A)(Y)(C_3N_3)Cl + HOC_6H_4AsO_3H_2$
$\quad\quad \rightarrow (A)(Y)(C_3N_3)(OC_6H_4AsO_3H_2)$
(5) $\;\;(A)(Y)(C_3N_3)Cl + NH_2C_6H_4As=O$
$\quad\quad \rightarrow (A)(Y)(C_3N_3)(NHC_6H_4As=O)$
(6) $\;\;(A)(Y)(C_3N_3)Cl + HOC_6H_4AsO_3R_2$
$\quad\quad \rightarrow (A)(Y)(C_3N_3)(OC_6H_4AsO_3R_2)$ wherein A, Y, R, and $C_3N_3$ are as previously defined. The reaction can be further generalized by the use of the reactant TH wherein T is as previously defined and H is an active hydrogen attached to the group, e.g.

(1) $\;\;(A)_2(C_3N_3)Cl + TH \rightarrow A_2(C_3N_3)T$, or
(2) $\;\;(A)(C_3N_3)Cl_2 + 2TH \rightarrow (A)(C_3N_3)(T)_2$, or
(3) $\;\;(A)(Y)(C_3N_3)Cl + TH \rightarrow (A)(Y)(C_3N_3)T$ Typical specific examples of the above reactions are:

(1) $(NH_2)_2(C_3N_3)Cl + NH_2C_6H_4AsO_3H_2 \xrightarrow{NaOH} (NH_2)_2(C_3N_3)NHC_6H_4AsO_3H_2$ (2) $NH_2(C_3N_3)Cl_2 + 2NH_2C_6H_4AsO_3H_2 \xrightarrow{NaOH} NH_2(C_3N_3)(NHC_6H_4AsO_3H_2)_2$ (3) $(NH_2)(HO)(C_3N_3)Cl + NH_2C_6H_4AsO_3H_2 \xrightarrow{NaOH} (NH_2)(HO)(C_3N_3)(NHC_6H_4AsO_3H_2)$ Alternately these compounds can be prepared by using a halotriazine containing a T group as a substituent and reacting it with a compound containing a reactive hydrogen, represented by MH, wherein M represents Y or A, as for example (1) $Cl_2(C_3N_3)T + 2MH \xrightarrow{\text{hydrohalide acceptor}} M_2(C_3N_3)T$ or (2) $Cl(C_3N_3)(T)_2 + MH \xrightarrow{\text{hydrohalide acceptor}} M(C_3N_3)T_2$ or (3) $(A)(Cl)(C_3N_3)T + MH \xrightarrow{\text{hydrohalide acceptor}} (M)(A)(C_3N_3)T$ or (4) $(Y)(Cl)(C_3N_3)T + MH \xrightarrow{\text{hydrohalide acceptor}} (M)(Y)(C_3N_3)T$ more specifically, for example (1a) $(Cl_2)(C_3N_3)T + 2C_6H_5NH_2 \xrightarrow{NaOH} (C_6H_5NH)_2(C_3N_3)T$ (2a) $(Cl)(C_3N_3)T_2 + NH_3 \xrightarrow{NaOH} NH_2-(C_3N_3)T_2$ (3a) $(NH_2)(Cl)(C_3N_3)T + NH_2C_6H_4OH \xrightarrow{NaOH} (NH_2)(T)(C_3N_3)-NHC_6H_4OH_2$ (4a) $(HO)(Cl)(C_3N_3)T + NH_3 \xrightarrow{NaOH} (NH_2)(HO)(C_3N_3)T$ Illustrative examples of MH compounds are the alcohols, such as $CH_3OH$, $C_2H_5OH$, $(CH_3)_2CHOH$, $C_4H_9OH$, $C_{12}H_{25}OH$, etc., the cycloaliphatic alcohols, such as cyclohexanol, cycloheptanol, cyclopentanol, etc., ammonia and the amines, e.g. $CH_3NH_2$, $C_2H_5NH_2$, $(CH_3)_2NH$, $CH_2=CHCH_2NH_2$, $C_6H_5NH_2$ $CH_3C_6H_4NH_2$, $ClC_6H_4NHCH_3$, cyclohexylamine, etc., together with various other compounds, numerous examples of which are given in my copending application Serial No. 764,252, filed September 30, 1958.

The arseno-oxide compounds of this invention can also be prepared by reducing the arsonic acid derivatives with $SO_2$ preferably in the presence of iodide ion, e.g.

(1) $(NH_2)_2(C_3N_3)-NHC_6H_4AsO_3H_2 \xrightarrow[I^-]{SO_2} (NH_2)_2(C_3N_3)-NHC_6H_4As=O$ (2) $NH_2(C_3N_3)(NHC_6H_4AsO_3H_2)_2 \xrightarrow[I^-]{SO_2} NH_2(C_3N_3)(NHC_6H_4As=O)$ The following examples illustrate the practice of this invention and are given by way of illustration and not by limitation. Unless specifically indicated otherwise, parts and percentages are intended as parts by weight and percent by weight, respectively.

EXAMPLE I

*Preparation of intermediates*

Finely ground 2,4-diamino-6-chloro-1,3,5-triazine (43.8 parts) are suspended in 1000 parts of hot water containing 5 parts of concentrated hydrochloric acid, 2 parts of octyl alcohol and 65 parts of p-aminobenzene arsonic acid, and the mixture refluxed for one-half hour. The solution is then decolorized with charcoal and filtered hot. The filtered solution is made strongly acid by the addition of 100 parts of concentrated hydrochloric acid. The resulting hydrochloride is removed by filtration and suspended in 1200 parts of hot water and NaOH added until the solution is neutral to Congo red indicator. The precipitated product is then removed by filtration, washed free of chlorides and dried at 100° C. The yield is 95–98% of the theoretical yield of the compound of the formula

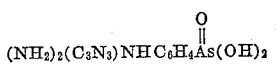

On analysis the product gives values of 33.31% carbon, 3.8% hydrogen, 25.54% nitrogen, and 23.0% arsenic, which are in close agreement with the theoretical values.

The 2,4-di(4′arsonoanilino)-6-amino-1,3,5-triazine is prepared as follows. Fifty-five (55) parts of 2-amino-4,6-dichloro-1,3,5-triazine is suspended in 1000 parts of hot water containing 5 parts of commercial hydrochloric acid and 2 parts of octyl alcohol with 77 parts of p-arsinilic acid and the mixture refluxed for 2 hours. The solution is then decolorized with activated charcoal, filtered hot, and then made strongly acid by the addition of 100 parts of concentrated hydrochloric acid. After cooling, the salt is removed by filtration and suspended in 1000 parts of water, made neutral to Congo red indicator by adding NaOH, filtered and washed free of chlorides. There is obtained a 60–80% yield of

which on analysis gives the values: 34.1% carbon, 15.9% nitrogen, 3.4% hydrogen, and 28.41% arsenic. These are in close agreement with the theoretical values.

The arsonic acids prepared above are reduced to the arseno compounds in the following manner.

Forty-five parts of 2-(4′-arsonoanilino)-4,6-diamino-1,3,5-triazine are suspended in 560 parts of concentrated hydrochloric acid to which is added slowly 12 parts of $SO_2$ dissolved in 180 parts of concentrated hydrochloric acid containing ¼ part of HI. The mixture is then cooled to 2–10° C. for 48–72 hours after which it is poured over 1200 parts of ice and 450 parts of $Na_2CO_3$ dissolved in 1200 parts of water. Solid sodium bicarbonate is added until the suspension is neutral and washed by forming a slurry in 600 parts of water. The product is recrystallized from 6000 parts of water at a pH below 6 (adjusted with acetic acid) and allowed to crystallize slowly to fine needles (the dihydrate), which is dehydrated at 135° C. in vacuo and on analyses gives the following values: 36.71% carbon, 3.5% hydrogen, 28.05% nitrogen, and 25.7% arsenic, which values are in close agreement with the theoretical values.

By these procedures and related procedures, as disclosed in J.A.C.S., 66, 1771–1778 inc. (1944), intermediate compounds used in the practice of this invention can be prepared.

EXAMPLE II

| | Parts |
|---|---|
| $(NH_2)_2(C_3N_3)$—$NHC_6H_4As$=O | 21 |
| Aqueous formaldehyde (37.2%) | 32 | are heated together under reflux at the boiling point of the mixture for 30 minutes, yielding a condensation product that cures to an insoluble, infusible mass when a sample is heated on a hot plate at 150° C. A satisfactory compound that shows adequate flow characteristics during molding is produced by mixing a portion of the resinous syrup with a weight of alpha cellulose equal to the solid content of the syrup, followed by drying at low temperature to remove the excess water. A well-cured, molded piece is obtained by molding a sample of the dried, ground molding compound for 3 minutes at 145° C. under a pressure of 5000 pounds per square inch.

Instead of heating the reactants under reflux, as described above, the mixture can be shaken or stirred for a longer period, for example, 24 to 72 hours or longer at room temperature, to effect reaction between the components and to obtain a soluble, fusible reaction product which can be heat-hardened. This condensation is performed preferably in the presence of an alkaline condensation catalyst, such as sodium hydroxide, sodium carbonate, ammonia, triethanolamine, hexamethylene tetramine, etc., and cured in the presence of acidic curing catalysts, or catalysts which under the influence of the reaction or heat produce acidic substances, such as acetic acid, phthalic acid, ammonium phosphate, ammonium chloride, glycine, chloroacetamide, chloroacetyl urea, etc.

EXAMPLE III

| | Parts |
|---|---|
| $(CH_3NH)_2(C_3N_3)NHC_6H_4AsO$ | 130 |
| Aqueous $CH_2O$ (37.5% $CH_2O$) | 143 |
| NaOH in 5.5 parts $H_2O$ | 0.3 |

The above ingredients are refluxed for 30 to 45 minutes to produce a resin dispersion which, when neutralized with acetic acid and dehydrated, produces a clear thermoplastic resin. This resin is acidified with 1 part of phthalic anhydride and heated further to give a hard resin. This resin is also an effective plasticizer for unmodified melamine-formaldehyde or urea-formaldehyde resin. In many cases it is desirable to intercondense this triazine compound directly with the melamine and formaldehyde, or with urea and formaldehyde as shown in subsequent examples.

When an equivalent amount of glyoxal is used instead of formaldehyde in this example, the thermosetting compositions are obtained.

EXAMPLE IV

| | Parts |
|---|---|
| $(CH_3NH)_2(C_3N_3)NHC_6H_4AsO$ | 60 |
| Urea | 40 |
| Aqueous $CH_2O$ (37.5% $CH_2O$) | 165 |
| Aqueous $NH_3$ (28% $NH_3$) | 2.5 |
| NaOH in 5.5 parts $H_2O$ | 0.2 |

The above ingredients are refluxed for 25 minutes to produce a clear syrup. On dehydration it cures slowly at 140° C. but on the addition of chloro-acetamide, the cure is accelerated. The addition of 80 parts of alpha flock to the syrup produces a molding compound, which, after being dried at 70° C. has an excellent cure and good flow when molded at 135° C. for 4 minutes. The product has a glossy surface and is light-colored. When an equivalent amount of thiourea is substituted in the above formula, the type of cure, molding characteristics, and appearance of the molded product obtained is substantially the same as with that of urea.

EXAMPLE V

| | Parts |
|---|---|
| $(NH_2)_2(C_3N_3)NHC_6H_4AsO$ | 135 |
| Paratoluene sulfonamide | 50.8 |
| Aqueous $CH_2O$ (37.5% $CH_2O$) | 190 |
| NaOH in 5.5 parts $H_2O$ | 0.2 |

The above ingredients are refluxed for one-half hour to produce a syrup which is clear while hot and cloudy on cooling, and has a slow cure. The addition of three parts of phthalic anhydride accelerates the cure.

EXAMPLE VI

| | Parts |
|---|---|
| $(NH_2)_2(C_3N_3)NHC_6H_4AsO$ | 130 |
| Aqueous $CH_2O$ (37.5% $CH_2O$) | 190 |
| Phenol | 29.0 |
| NaOH in 6 parts $H_2O$ | 0.3 |

The above ingredients are refluxed for 25–30 minutes to give a clear syrup when hot. At 135° C. the syrup has a prolonged cure but when 2.5 parts of chloroacetamide are added to the composition, an excellent cure is obtained.

EXAMPLE VII

| | Parts |
|---|---|
| $(NH_2)_2(C_3N_3)NHC_6H_4AsO$ | 115 |
| Melamine | 50 |
| Aqueous $CH_2O$ (37.5% $CH_2O$) | 210 |

The above mixture is refluxed for 15 minutes. The syrup is clear when hot, when dehydrated cures alone at 135°–140° C., and a molding compound containing

EXAMPLE VIII

| | Parts |
|---|---|
| $(NH_2)_2(C_3N_3)NHC_6H_4AsO$ | 140 |
| Dimethylol urea | 550 |
| $NH_3$ (in 2.5 parts $H_2O$) | 5 |
| $H_2O$ (distilled) | 1000 |
| NaOH (in 10 parts $H_2O$) | 0.35 |

The above components are mixed and refluxed for 15 minutes. The syrup does not cure well alone at 135° C. but the addition of 3 parts of chloroacetamide accelerates the cure.

EXAMPLE IX

| | Parts |
|---|---|
| $(H_2N)(H_2NO_2SC_6H_4NH)(C_3N_3)NHC_6H_4AsO$ | 130 |
| Aqueous $CH_2O$ (37.5% $CH_2O$) | 210 |
| $NH_3$ in 5 parts $H_2O$ | 2.0 |
| Aqueous trimethylol melamine (50% solu.) | 130 |

When the above ingredients are refluxed for 20–30 minutes a syrup is obtained which cures slowly alone. The cure is accelerated by ammonium chloride to produce hard resins and molding compounds.

EXAMPLE X

| | Parts |
|---|---|
| $(NH_2)(NH_2CONHNH)(C_3N_3)NHC_6H_4AsO$ | 130 |
| Aqueous $CH_2O$ (37.5% $CH_2O$) | 150 |
| Glycerine | 10 |

The above mixture is refluxed for 25–30 minutes to produce a clear resin curing at 135°–140° C., which cure is accelerated by the addition of curing agents.

EXAMPLE XI

| | Parts |
|---|---|
| $(NH_2)_2(C_3N_3)NHC_6H_4AsO$ | 125 |
| Aqueous $CH_2O$ (37.5% $CH_2O$) | 150 |
| Butyl alcohol | 100 |

These ingredients are mixed and refluxed for one-half hour to produce a clear syrup which cures slowly at 135° C. After reflux, the water is removed from the reaction product by azeotroping the mixture and returning the butyl alcohol to the reaction. The butylated resin is reacted with heat-convertible alkyd resins for coatings and enamels of excellent color retention and durability.

EXAMPLE XII

| | Parts |
|---|---|
| $(HOC_6H_4NH)_2C_3N_3NHC_6H_4AsO$ | 125 |
| Aqueous $CH_2O$ (37.5% $CH_2O$) | 150 |
| Diethyl malonate | 20 |
| NaOH in 20 parts $H_2O$ | 2.5 | are refluxed for 20 minutes to produce a condensation product which cures at 140°–160° C.

EXAMPLE XIII

| | Parts |
|---|---|
| $(NH_2)_2(C_3N_3)OC_6H_4AsO$ | 120 |
| Aqueous $CH_2O$ (37.5% $CH_2O$) | 140 |
| $NH_3$ in 5 parts $H_2O$ | 1.0 |
| Acetamide | 15.0 |

The above mixture is refluxed for 15 minutes to produce a clear syrup which cures alone at 135° C. With phthalic anhydride, chloroacetamide and ammonium chloride, respectively, the cure is excellent.

EXAMPLE XIV

| | Parts |
|---|---|
| $(NH_2)_2(C_3N_3)C_6H_4AsO$ | 65 |
| Acrolein | 38 |
| NaOH in 5 parts $H_2O$ | 0.2 |

The reactants are mixed and refluxed for 15 minutes to produce a syrup which cures at 140° C. to a hard tough resin by the addition of acids or acid producing curing catalysts.

EXAMPLE XV

| | Parts |
|---|---|
| Shellac | 50 |
| OAs—$C_6H_4NH(C_3N_3)(NHCH_2OH)_2$ | 15 |

The dimethylol derivatives are prepared in accordance with the low temperature procedure of Example I. The above components are mixed well and fused at 150° C. At this temperature, the mixture cures to a hard infusible resin. The addition of paraform and hexamethylene tetramine, respectively, hastens the cure.

EXAMPLE XVI

| | Parts |
|---|---|
| Alkyd resin (e.g. glyceryl phthalate) | 50 |
| OAs—$C_6H_4NH(C_3N_3)(NHCH_2OH)_2$ | 15 |

These components are mixed together and heated on a hot plate at 150° C., and cures to a hard, infusible product. The curing is accelerated by paraform.

EXAMPLE XVII

| | Parts |
|---|---|
| 1-phenyl guanazole | 35 |
| Aqueous formaldehyde (37.5% $CH_2O$) | 35 |
| Ammonia (28%) | 2 |
| Aqueous NaOH (0.5 N) | 0.75 |
| Reaction product of Ex. I | 9 | are heated together under reflux for 5 minutes at the end of which period separation of a resinous mass occurs. This resin is used satisfactorily for the production of molding compounds.

EXAMPLE XVIII

| | Parts |
|---|---|
| Soya bean protein | 25 |
| Aqueous ammonia (28% $NH_3$) | 2.5 |
| Aqueous NaOH (0.5 N) | 3.0 |
| Aqueous $CH_2O$ (37.5% $CH_2O$) | 150 |
| $(NH_2)_2(C_3N_3)NHC_6H_4AsO$ | 80 | are heated together under reflux at the boiling point of the mixture for 20 minutes. The resulting syrup is mixed with 90 parts of alpha-cellulose and 0.2 part of zinc stearate to form a molding compound which is dried at 70° C. On molding, a well-cured molded piece having a well-knit and homogeneous structure is obtained.

EXAMPLE XIX

| | Parts |
|---|---|
| $(NH_2)_2(C_3N_3)NHC_6H_4AsO$ | 100 |
| Aldol | 100 | are mixed together and then heated for 40 hours at 60° C. The resinous material thereby obtained melts on a hot plate at 140° C., and is converted to an insoluble, infusible state by the addition of chloroacetamide.

EXAMPLE XX

| | Parts |
|---|---|
| $(NH_2)_2(C_3N_3)NHC_6H_4AsO_3H_2$ | 140 |
| Aqueous $CH_2O$ (37.5% $CH_2O$) | 80 |
| NaOH in 100 parts $H_2O$ | 20 | are heated together under reflux at the boiling point of the mixture for 30–45 minutes yielding a viscous resinous dispersion which can be used directly as a tanning agent as shown in later examples, either as prepared or diluted to the desired concentration of solids. Also, it can be treated with sulfuric acid to liberate the resinous acid having a free arsonic group, which resin can be converted by heating to an insoluble, fusible product suitable as an ion exchange resin. Alternately, the sodium can be converted to other salts, such as the calcium, copper, antimony, nickel, etc., by the addition of an aqueous solution of such a salt, e.g. copper sulfate, cupric chloride, ferrous acetate, etc. These metallated resins, e.g., the copper resinate, can be used with cellulosic fillers, such as cotton, wood flour, alpha flock, to prepare molding compounds which are fungus and mold-resistant. They can also be used as coating and impregnants for wood as wood preservatives, especially the copper and arsenic salts.

The specific resin of this example, particularly in the form of the polyethylene-imine salt, can also be used to impregnate paper and other fibrous sheet material and thereafter cured by heating to increase the wet strength of the paper. Paper impregnated with the resin in its acid form can be used for the separation and identification of organic bases using the standard paper-chromatography techniques. For these and other uses, this resin can be modified as shown in subsequent examples.

EXAMPLE XXI

| | Parts |
|---|---|
| $NH_2(C_3N_3)(NHC_6H_4AsO_3H_2)_2$ | 440 |
| Aqueous $CH_2O$ (37.5% $CH_2O$) | 120 |
| NaOH in 200 parts $H_2O$ | 80 | are refluxed for 2 hours to produce a condensation product especially suitable as a tanning agent as such or as diluted to the desired concentration.

This specific condensation product contains two arsonic groups for each triazine ring and therefore can be reacted in part with other metals such as copper and still retain good dispersibility in water and related solvents. Instead of using the triazine derivatives of Examples II and III alone, a mixture of such derivatives can be used to produce a wide variety of condensation products varying from one sulfonic group to two sulfonic groups per triazine ring in the condensation product.

EXAMPLE XXII

| | Parts |
|---|---|
| $(NH_2)_2(C_3N_3)NHC_6H_4AsO_3H_2$ | 140 |
| Aqueous $CH_2O$ (37.5% $CH_2O$) | 90 |
| Water | 70 | are mixed in a reaction flask equipped with a stirrer and reflux condenser. The mixture is heated to 90° C. for 1 hour and thereafter is cast into a shallow container and heated in an oven until the product is dry and hard. The product is then ground, washed with distilled water, and redried. The resulting acidic ion exchange resin absorbs about 89.91% of the calculated amount of NaOH from a 5% NaOH solution and then exchanges the sodium ion for calcium, magnesium, copper, silver ions, etc., upon treatment respectively with solutions containing such ions.

This condensation product can be modified by cocondensing the triazine derivative and the aldehyde with other aldehyde reactable substances, including those that have ion exchange resin groups, e.g., urea, melamine, phenol, phenolsulfonic acid, etc. An amphoteric ion exchange resin is readily prepared by using a triazine having a multiplicity of groups having ion exchange properties, e.g., a triazine having both an arsonic group and an amine group, e.g.,

$(NH_2)(C_3N_3)(NHC_6H_4AsO_3)(NH\text{-pyridyl})_2$

EXAMPLE XXIII

Fifty pounds of pickled sheepskins are placed in a drum with 100 pounds of 5% salt solution and the drum is rotated. There is then added 39 pounds of the condensation product of Example XX, three portions of 13 pounds each at one-half hour intervals, and the drumming continued for 6–8 hours. The skins are then allowed to lie in the liquor for 8–10 hours and then drummed for another one-half hour, after which the skins are drained and washed thoroughly, set out, crusted, and finished by the ordinary methods with excellent results. In a similar manner kid skins, calf skins, pig skins, snake skins, deer skins, bear skins, alligator skins, shark skins, etc., are tanned.

The tanning agents of this invention can also be used as a supplementary tannage, for example, for skins that have been given a preliminary chrome or alum tannage, or they can be used in conjunction with other natural or synthetic tannages, as for example:

(A) Fifty pounds of chrome tanned kidskins at the end of tannage and before being dried out are added to 50 pounds of water in a rotating drum together with 8 pounds of the condensation product of Example XX. The drumming is continued for 2 hours after which the skins are washed thoroughly, fat-liquored, set out, crusted, and finished by the ordinary finishing methods with excellent results.

(B) Fifty pounds of alum tanned calfskins are given a supplementary, excellent tanning using 10 pounds of the condensation product of Example XX, using the procedure used for tanned kidskins.

Instead of the condensation product of Example XX, the condensation products of Examples XXIV to XXVII inclusive, respectively, are also used in the above procedures to produce light colored tanned leather which shows high shrink temperatures.

Instead of using the condensation products alone, the products of this invention can be used with other natural and synthetic tanning agents for example, by using mixtures of liquid quebracho extract with the condensation products of this example. For example, 100 pounds of pickled pigskins are treated with 40 pounds of a mixture of equal parts of liquid quebracho extract and the condensation product of Example XX, in 300 pounds of a 5% salt solution in a rotating drum. Ten pounds of the tanning mixture are added in four equal feeds at intervals of about one-half hour and the drum continued for an additional 4–5 hours, after which the skins are allowed to remain in the liquor for 1–2 hours, then drummed for an additional hour. At the end of the drumming period, the hides are washed thoroughly, fat-liquored, set out, crusted, and finished in the ordinary method with excellent results.

Instead of the quebracho extract used above, synthetic tanning agents can be used, such as the reaction products of aromatic sulfonic acids and aldehydes, for example, phenol-sulfonic acid and formaldehyde. A typical preparation is as follows: to 94 parts of phenol are added slowly 150 parts of 66° Baumé sulfuric acid at room temperature, and upon completion of the addition of the acid, the temperature is raised slowly to 90–100° C. and reacted for 2 hours, after which 70 parts of water and 60 parts of 38% formaldehyde are added and the temperature maintained at 75–85° C. for one hour. The solution is then cooled, the excess sulfuric acid neutralized with sodium hydroxide, and then diluted with water to a 45–47% solids content for use in tanning mixtures containing the condensation products of this invention. Alternately, the aromatic sulfonic acid can be condensed with an aldehyde, for example, phenol sulfonic acid and formaldehyde, initially together with the triazine derivatives of this invention to produce tanning agents with improved color over corresponding aromatic-aldehyde compositions in which the triazine derivatives have been omitted, e.g.:

Ninety-four parts of phenol is heated to 35° C., 150 parts of 66° Baumé sulfuric acid is added slowly, and the temperature raised to 90–100° C. and maintained at this temperature for 2 hours. Seventy parts of water are then added together with 15 parts of

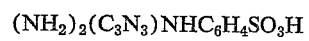

$(NH_2)_2(C_3N_3)NHC_6H_4SO_3H$ and 65 parts of 38% formaldehyde solution and the reaction continued for 2 hours. The solution is then cooled, the excess mineral acid neutralized with sodium hydroxide and the resulting solution diluted to the desired strength. This solution is used directly as a tanning agent as shown hereinabove.

EXAMPLE XXIV

| | Parts |
|---|---|
| $NH_2(C_3N_3)(NHC_6H_4AsO_3H_2)_2$ | 120 |
| Aqueous $CH_2O$ (37.5% $CH_2O$) | 190 |
| Phenol | 30 |

To the above mixture is added sufficient 20% NaOH solution to adjust the pH to 8–8.5 and the mixture refluxed for 1–2 hours to produce the condensation product.

EXAMPLE XXV

| | Parts |
|---|---|
| $[(NH_2)_2(C_3N_3)NHC_6H_4AsO_3]_2Cu$ | 80 |
| Dimethylol urea | 500 |
| $NH_3$ (in 2.5 parts $H_2O$) | 1 |
| $H_2O$ distilled | 500 |
| Ethyl alcohol | 200 |
| NaOH in 1 part $H_2O$ | 0.5 | are refluxed together until a noticeable viscosity increase is observed. Then the mixture is cooled to room temperature and used with excellent results to impregnate soft-pine as a wood preservative.

EXAMPLE XXVI

| | Parts |
|---|---|
| $(NH_2)_2(C_3N_3)OC_6H_4AsO(ONH_4)_2$ | 120 |
| Aqueous $CH_2O$ (37.5% $CH_2O$) | 150 |
| Glycerine | 20 | are mixed and refluxed for 30 minutes and the condensation products are used directly in the tanning of hides after dilution to the desired concentration.

EXAMPLE XXVII

| | Parts |
|---|---|
| $(CH_3NH)_2(C_3N_3)NHC_6H_4AsO_3K_2$ | 60 |
| Aqueous $CH_2O$ (37.5% $CH_2O$) | 80 |
| Polyvinyl alcohol in 50 parts $H_2O$ | 5 | are refluxed for 30 minutes to produce a clear syrup which can be used for tanning of hides or as a mordant for wool, silk, or cotton, and as an impregnant for paper, wood, etc.

While certain features of this invention have been described in detail with respect to various embodiments thereof, it will, of course, be apparent that other modifications can be made within the spirit and scope of this invention, and it is not intended to limit the invention to the exact details shown above, except insofar as they are defined in the following claims.

The invention claimed is:

1. A composition of matter comprising the reaction product of a mass comprising an aldehyde and a triazine derivative having the formula:

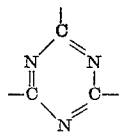

wherein at least one of said valencies is attached to an aldehyde-reactable group and at least one of said valencies is attached to a group containing an aromatic nucleus having substituted thereon 1 to 3 groups selected from the class consisting of —AsO, the sodium, potassium, lithium, calcium, copper, chromium, amine, hydrazine, and protein salts of —$AsO(OH)_2$, and —$AsO(OR)_2$, wherein R is a radical selected from the class consisting of hydrogen, monovalent hydrocarbon radicals and the fluoro, chloro, nitro, nitroso, amino, carboxy, carbalkoxy, alkoxy, aryloxy, and mercapto derivatives of monovalent hydrocarbon radicals, said aldehyde being reacted in an amount of 1–8 moles per mole of triazine derivative, said reaction being conducted at a temperature of at least room temperature and being catalyzed by an agent selected from the class consisting of alkaline and acidic aldehyde-condensation catalysts.

2. A composition of claim 1, in which the triazine derivative has the formula $NH_2$—$C_3N_3(NHC_6H_4AsO_3H_2)_2$.
3. A composition of claim 1, in which the triazine derivative has the formula $(NH_2)_2C_3N_3$—$NHC_6H_4AsO$.
4. A composition of claim 1, in which the triazine derivative has the formula $OAsC_6H_4NHC_3N_3(NHCH_2OH)_2$.
5. A composition of claim 1, in which the triazine derivative has the formula $(CH_3NH)_2C_3N_3$—$NHC_6H_4AsO$.
6. A composition of claim 1, in which the triazine derivative has the formula $(CH_3NH)_2C_3N_3$—$NHC_6H_4AsO_3H_2$.
7. A composition of claim 1, in which said mass also comprises melamine.
8. A composition of claim 1, in which said mass also comprises dimethylol urea.
9. A composition of claim 1, in which said mass also comprises a glyceryl phthalate resin.
10. A composition of claim 1, in which said aldehyde comprises formaldehyde.
11. A condensation product of an aldehyde and $$(NH_2)_2(C_3N_3)(NHC_6H_4AsO_3H_2)$$

12. A condensation product of claim 11, in which said aldehyde is formaldehyde.
13. A condensation product of an aldehyde and $$NH_2(C_3N_3)(NHC_6H_4AsO_3H_2)_2$$

14. A condensation product of claim 13, in which said aldehyde is formaldehyde.
15. A process for preparing resinous products comprising the step of reacting an aldehyde with a triazine derivative having the formula:

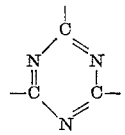

wherein at least one of said valencies is attached to an aldehyde-reactable group and at least one of said valencies is attached to a group containing an aromatic nucleus having substituted thereon 1 to 3 groups selected from the class consisting of —AsO, the sodium, potassium, lithium, calcium, copper, chromium, amine, hydrazine, and protein salts of —$AsO(OH)_2$, and —$AsO(OR)_2$, wherein R is a radical selected from the class consisting of hydrogen, monovalent hydrocarbon radicals and the fluoro, chloro, nitro, nitroso, amino, carboxy, carbalkoxy, alkoxy, aryloxy, and mercapto derivatives of monovalent hydrocarbon radicals, said aldehyde being reacted in an amount of 1–8 moles per mole of triazine derivative, said reaction being conducted at a temperature of at least room temperature and being catalyzed by an agent selected from the class consisting of alkaline and acidic aldehyde-condensation catalysts.

16. A process of claim 15, in which said aldehyde is formaldehyde.
17. A process of claim 16, in which said reaction is performed in a mixture also containing an aldehyde-reactable amine compound in addition to said triazine derivative.
18. A process of claim 17, in which said other aldehyde-reactable compound is melamine.
19. A process of claim 17, in which said other aldehyde-reactable compound is dimethylol urea.

References Cited in the file of this patent

UNITED STATES PATENTS 2,643,990    Ham _____ June 30, 1953